United States Patent Office 3,328,481
Patented June 27, 1967

3,328,481
ORGANOSILICON RESINS
Harold L. Vincent, Midland, Mich., assignor to Dow Corning Corporation, Midland, Mich., a corporation of Michigan
No Drawing. Filed Apr. 20, 1964, Ser. No. 361,258
28 Claims. (Cl. 260—825)

This application is a continuation-in-part of copending application Serial No. 268,545, filed Mar. 28, 1963, now abandoned.

This invention relates to a new kind of organosilicon resin. More specifically, this invention relates to organosilicon resins which have vastly improved properties over the prior art organosilicon resins.

Organosilicon resins are widely used where rigid or essentially rigid coatings, molded articles or other materials are required which have one or more of the properties now ordinarily ascribed to silicone materials, such as outstanding thermal stability, oxidative resistance, weather-ability, ozone resistance, electrical resistance, electrical insulative ability, and the like.

Prior art organosilicon resins, generally known as silicone resins, while finding wide acceptance for the above reasons, nevertheless have been limited for several reasons. One of these has been that silicone resins which give flexible products when cured, are liquid at room temperature prior to curing. This severely limited the use of silicone resins as flexible coating compositions because there are many applications which require that the resin be applied in a powdered form to the base member. This is particularly true in the so-called fluid bed coating processes in which heretofore known silicone resins have been unsatisfactory.

A second property that would be desirable in a silicone resin, which property is not found among prior art organosilicon resins, is thermal shock resistance. Thermal shock resistance is a measure of the ability of a solid to retain its integrity when subjected to changes, usually sudden, in temperature. The thermal shock resistance of a solid is considered good if its integrity is retained, and poor if the substance cracks, chips, or shatters. Prior art solid resins have exhibited poor to very poor thermal shock resistance.

By their very nature, prior art silicone resins contain a fairly large percentage of material which does not, because it cannot, cure into the matrix. This material can be lost, and indeed is lost, when the resin is exposed to either high temperatures, in which case the material is lost by volatilization or the action of organic fluids, in which case the material is lost by dissolution. This loss of material causes shrinkage of the resin, with resultant stresses and even failures. Notably, it is found that, due primarily to the above, prior art resins lose more than half their room temperature strengths at elevated temperatures.

One very notable defect in prior art resins has been in toughness. Prior art resins are virtually completely lacking in this department. Toughness is herein used as a term for resistance to mechanical shock. For example, mechanical shock is rendered to a disk when it is struck by a hammer. If the disk is comprised of prior art organosilicon resins, it shatters. A disk made of a resin having good toughness does not shatter under the same impact. Toughness is displayed in resins employed in preparing laminates whereby improved interlaminar strengths are obtained.

Prior methods of preparing organosilicon resins have precluded any ordered configuration of the product. The random structures obtained following these past procedures have been useful only because the randomness seemed to be an equilibrium condition that could be fairly well reproduced, although even these random results were subject to variances, the causes of which could not always be ascertained.

It is an object of the present invention to provide a new organosilicon resin which results from the cure of a material which is a solid at ordinary temperatures, which cured resin is not brittle. Another object of this invention is to provide a cured resin having good to excellent thermal shock resistance. Another object is to provide a cured resin substantially all of which is part of the cured matrix. Still another object is to provide an organosilicon resin having excellent toughness. Another object is to prepare an organosilicon resin having an ordered configuration. These and other objects will be met in the following description.

This invention relates to a block copolymer comprising (A) polymer blocks of the average structure

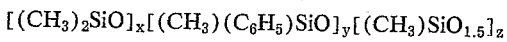

wherein the sum of $x+y+z$ has an average value of from 6 to 100 inclusive, and $y$ and $z$ each have a value of up to 10 percent of the sum of $x+y+z$, and (B) polymer blocks of the average unit formula

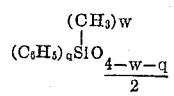

wherein $q$ has an average value of from 1 to 1.1 inclusive and $w$ has an average value of up to 0.1 inclusive, the siloxane units in (A) being from 10 to 75 mol percent and the siloxane units in (B) being from 25 to 90 mol percent of the total siloxane units in said block copolymer, the minimum mol percent of siloxane units (B), when the sum of $x+y+z$ has an average value of from 50 to 100 being determined by the equation $$\frac{50M}{S} + 0.1\ S = 30$$

where M is the minimum mol percent of siloxane units, (B) and S is the sum of $x+y+z$.

It is important that the essentially block character of the copolymer be obtained, else the composition does not have the desired advantageous properties over prior art resins. Thus, the limitation of an average of at least six siloxane units in the essentially dimethylsiloxane block is a critical one. When the average block length is less than six siloxane units, the resulting copolymer does not cure to a resin having the desired properties.

The stated maximum average siloxane unit length of the (A) component cannot be exceeded, since compositions made with (A) components wherein the average sum of $x+y+z$ exceeds 100 produce cheesy materials on curing which are neither strong nor resinous. Between the two stated limits, good strong resins are obtained, with flexibility of the resin increasing with the longer average siloxane unit length of component (A), other factors being equal.

Siloxane block unit (A) is an essentially dimethylpolysiloxane block having an average siloxane unit length as stated above. Small amounts of phenylmethylsiloxane units can be tolerated, replacing some of the dimethylsiloxane units, and are indeed beneficial when it is desired to modify the melting point of the copolymer of the invention. Amounts of phenylmethylsiloxanes up to 10 mol percent of the total siloxane units of component (A) can be tolerated, and are further beneficial in that the low temperature properties of the resulting resin are enhanced. In addition, small amounts, up to 10 mol percent, of monomethylsiloxane units can be present in siloxane units (A). The monomethylsiloxane units serve purposes similar to the phenylmethylsiloxane units, except that the softening effect on the cured resin due to the phenylmethylsiloxane units in this component is not found when monomethylsiloxane units are employed.

Both the phenylmethylsiloxane units and monomethylsiloxane units are optionally present. Each type of unit can be present up to the maximum stated, and in addition both types of units can be present in either random or specific locations in the block unit (A). Preferably, one or the other type of unit other than dimethylsiloxane unit is present; preferably these units are present in amounts less than 5 mol percent of the siloxane units of polymer block (A); most preferably they are present in no more than 2 mol percent of the siloxane units of polymer block (A); and they can both be essentially completely absent from polymer block (A), in which case the block is essentially a dimethylpolysiloxane.

As stated above, the average block size of polymer block (A) can be from 6 to 100 inclusive. It is to be understood that these figures are only average figures, and as is the case with all polymeric materials, there are portions of the siloxane having siloxane unit lengths both longer and shorter than the average. This is as common in the organosilicon polymer field as in the organic polymer field. The performance of the composition of this invention, or its integrity, is not dependent upon the distribution of various siloxane unit lengths in siloxane block (A), but only on the average siloxane unit length of the blocks, or "average block size."

Polymer block (B) contains units of the formula $C_6H_5SiO_{1.5}$, $(C_6H_5)_2SiO$ and $C_6H_5(CH_3)SiO$, there being no more than 10 mol percent of the latter two units present in the polymer block. Preferably, $C_6H_5(CH_3)SiO$ and/or $(C_6H_5)_2SiO$ units are present in no more than 5 mol percent of the units of polymer block (B). The presence of these units in polymer block (B) provides a lowered melting point for the copolymer and increased flexibility and softness in the cured resin. Thus, where these properties are desired the inclusion of phenylmethylsiloxane units or of diphenylsiloxane units in polymer block (B) becomes quite desirable.

The location of the $C_6H_5(CH_3)SiO$ units or $(C_6H_5)_2SiO$ units in (B) is not critical. These units, when present, can be located randomly or specifically, without affecting the performance or characteristics of block (B), the instant composition, or the resin cured therefrom.

The average size of polymer block (B) is dependent on (1) the average size of blocks (A) and (2) the mol percentage of (B) and (A). It has been found that when these variables are fixed that the average block size of (B) is also fixed, and therefore specification of this block size is redundant.

As stated above, from 10 to 75 mol percent (based on the total number of siloxane units) of the composition of this invention can be polymer block (A). When less than 10 mol percent of polymer block (A) is present, the composition cures to a resin that is not substantially more shock resistant than prior art resins. When more than 75 mol percent of the present composition is comprised of (A) units, the composition does not cure to a resin, but rather to a soft cheesy rubber having little strength. The maximum mol percent of (A) units present in the block copolymer is closely related to the average number of siloxane units per block (A) particularly when the average number of siloxane units per block (A) is from 50 to 100 inclusive units. The block copolymers of the invention are essentially composed of two types of blocks, specifically those blocks containing essentially dimethylsiloxane units (A) and those blocks containing essentially monophenylsiloxane units (B). When the mol percent of either (A) units or (B) units is fixed, the other mol percent is immediately known. The minimum mol percent of siloxane units (B), when the average number of units per block (A) is from 50 to 100 units, is determined by the equation $$\frac{50M}{S}+0.1\,S=30$$

where M is the minimum mol percent of siloxane units (B) and S is the sum of $x+y+z$. The maximum mol percent of siloxane units (A) when the average number of units per block (A) is from 50 to 100 units is equal to 100 minus the minimum mol percent of siloxane units (B). For example, when $x+y+z$ is equal to 80, the minimum mol percent of siloxane units (B) is 35.2 mol percent and the maximum mol percent of siloxane units (A) is 64.8 mol percent. The equation shown above only applies when the average number of units per block (A) is from 50 to 100 units. When the average number of units per block (A) is below 50 units, the equation is not applicable. The minimum mol percent of polymer block (A) and the maximum mol percent of polymer block (B) is not in any manner altered. The minimum mol percent of siloxane units (B) determines that percentage below which the block copolymers do not have thermal shock resistance. Between the limits stated above, compositions are obtained which cure to good strong resinous materials having the properties earlier ascribed. Generally, the higher the mol percentage of (A) the more flexible and soft the resulting resin. A preferred range is 25 to 65 mol percent of (A) with the balance of (B); even more preferred in many cases is the range of 40–65 mol percent of (A) and the balance of (B).

The composition of this invention can be prepared in several ways. One method comprises (I) reacting
 (a) $(C_6H_5)SiX_3$, wherein X is a halogen atom, with
 (b) a hydroxylated polysiloxane of the average structure $$[(CH_3)_2SiO]_x[(CH_3)(C_6H_5)SiO]_y[(CH_3SiO_{1.5}]_z$$

wherein the sum of $x+y+z$ has an average value of from 6 to 50 inclusive, and y and z each have a value of up to 10 percent of the sum of $x+y+z$, there being an average of at least two silicon-bonded hydroxyl radicals per molecule of said polysiloxane, in amount such that there is at least one mol of $(C_6H_5)SiX_3$ per mol of silicon-bonded hydroxyl radicals in (b) under conditions so that by-produced hydrogen halide is removed substantially as it is formed, and (II) cohydrolyzing the product from above with
 (c) a halosilane of the average formula $$(C_6H_5)_q\underset{\underset{\displaystyle(CH_3)_w}{|}}{Si}X_{4-w-q}$$

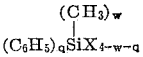

wherein X is as above defined, q has a value such that in the total of components (a)+(c) there is from 1 to 1.1 inclusive $C_6H_5$— radicals per silicon atom and w has a value such that in the total of (a)+(c) there is up to 0.1 inclusive $CH_3$— radicals per silicon atom, such that the sum total mol percent of silicon atoms in $(C_6H_5)SiX_3$ of (a) and $(CH)_w(C_3H_5)_qSiX_{4-w-q}$ of (c) comprise from 90 to 25 mol inclusive of the total silicon atoms in (a), (b) and (c) and silicon atoms in (b) comprise from 10 to 75 mol percent inclusive of the total number of silicon atoms in (a), (b) and (c).

Reaction (I) can be carried out at any temperature including room temperature. Generally, the chloride is employed, although as stated, X can be any halogen atom. Generally, the total amount of phenyltrihalosilane is present during reaction (I) that is desired to be present for both steps of the process. Hydroxylated polysiloxane (b) is normally added to phenyltrihalosilane (a). Generally, a solvent is employed, since the reaction is exothermic, and diffusion of (a) in (b) is aided thereby.

Thus, the solvent diffuses the reactants and the heat of reaction.

The solvent should be essentially moisture-free. The solvent should be an organic liquid that dissolves reactants and product. It is further desirable that the solvent be immiscible with water so that it can be employed in hydrolysis step (II). Suitable solvents include hydrocarbons such as heptane, cyclohexane, methylcyclopentane, benzene, toluene, xylene, naphtha and mineral spirits; halocarbons and halohydrocarbons such as perchloroethylene and chlorobenzene; ethers such as diethyl ether and methylamyl ether; halogenated ethers such as 2,2′-dibromodiethyl ether; and esters such as butyl acetate. When a solvent is used in reaction (I) that is miscible with water (e.g., tetrahydrofuran, acetonitrile, ethylene glycol dimethyl ether, etc.), another water immiscible solvent can be added prior to, during or just subsequent to the hydrolysis step (II), if desired. However, this solvent is not necessary.

The by-produced hydrohalide can be removed by trapping as, for example, an amine hydrochloride. Thus, there can be included in with the reactants a hydrogen halide acceptor such as pyridine, picoline, morpholine, tributylamine or other tertiary amines. Dry ammonia can also be employed. One of the simplest methods is to let the by-produced hydrogen halide escape as a gas. Often, it is advantageous to sparge the reaction vessel with a dry inert gas during the reaction (I) to aid in the rapid removal of the by-produced hydrogen halide. This last method also has the advantage of providing agitation and helping to remove the heat of reaction, thus controlling the reaction temperature. Dry ammonia can be added advantageously by the sparging method. Regardless of the method of removal of by-produced hydrogen halide, the product is ready for the cohydrolysis step (II) as soon as the hydrogen halide is removed, which removal promotes completeness of the desired reaction.

Hydroxylated polysiloxane (b) can contain only dimethylsiloxane units; or it can contain up to 10 mol percent of monomethylsiloxane units. When essentially none of the latter optional siloxane units are present, polysiloxane (b) is essentially hydroxyl endblocked. When monomethylsiloxane units are present in polysiloxane (b), some silicon-bonded hydroxyl radicals are present on non-terminal silicon atoms.

Reaction (I) occurs between a halogen atom of halosiloxane (c) and a hydroxyl radical of polysiloxane (b). The reaction is illustrated in the following equation, illustrating with a chlorosilane:

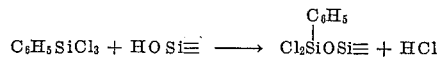

Thus, the product of reaction (I) is a polysiloxane of essentially the configuration of (b), wherein there is appended an —O—Si($C_6H_5$)$X_2$ radical at each site where siloxane (b) contained a hydroxyl radical. Reaction of any one phenyltrihalosilane with more than one hydroxyl radical of (b) is retarded by employing an excess of phenyltrihalosilane and/or by adding (b) to (a).

Subsequent to reaction step (I) the product therefrom is mixed with component (c), if the component (c) is not already present, and this mixture is cohydrolyzed by contacting it with water. Generally, this is accomplished by adding the above mixture to water. There should be enough water to allow hydrolysis of all the halosilane in the mixture. Preferably, there is an excess of water over this minimum amount. Most preferably there is a sufficient excess of water that the hydrogen halide formed by hydrolysis is present in less than 15 percent by weight of the water remaining after hydrolysis.

An acid acceptor can be present during the cohydrolysis step, if desired. This is not required, however, particularly if an excess of water is employed.

Component (c) of this process can be phenyltrihalosilane or a mixture of phenyltrihalosilane and phenylmethyldihalosilane and/or diphenyldihalosilane, there being no more than 10 mol percent of the two diorganosilanes present, based on the total of components (a) and (c). It should be pointed out that at least part of component (c) may be already present as unused component (a) from reaction step (I). If it is desired that component (c) contain essentially no phenylmethyldihalosilane or diphenyldihalosilane, then all of component (c) can be present prior to and during reaction step (I). While phenylmethyldihalosilane and/or diphenyldihalosilane can also be present during reaction (I), it is preferred, especially when substantial amounts (more than about 2 mol percent) are to be present, that this component be added after reaction step (I). Since generally it is preferred that less than 2 mol percent of component (c) be phenylmethyldihalosilane and/or diphenyldihalosilane the preferred and simpler method of preparing the composition of this invention is to have all of components, (c) and (a) combined, present during reaction step (I). This further ensures that, because an excess of phenyltrihalosilane is present, essentially no molecule of the halosilane will react with more than one silicon-bonded hydroxyl radical of siloxane (b).

Cohydrolysis step (II) produces the composition of this invention. If a solvent that is immiscible with water has been used, the composition is in solution and can be recovered by evaporation of the solvent. If a water miscible solvent or no solvent has been employed, the product precipitates from the water. Either method of recovering the composition is satisfactory.

Another excellent method of preparing the composition of this invention comprises (1) reacting [a]

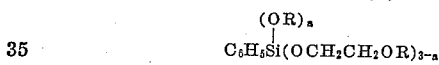

wherein each R is an alkyl radical of from 1 to 6 inclusive carbon atoms and $a$ is an integer of from 0 to 3 inclusive with [b] a hydroxylated polysiloxane of the average structure $[(CH_3)_2SiO]_x[(CH_3)(C_6H_5)SiO]_y[(CH_3)SiO_{1.5}]_z$ wherein the sum of $x+y+z$ has an average value of from 6 to 50 inclusive, and $y$ and $z$ each have a value of up to 10 percent of the sum of $x+y+z$, there being an average of at least two silicon-bonded hydroxyl radicals per molecule of said polysiloxane, in amount such that there is at least one mol of [a]

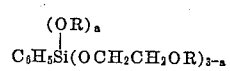

per mol of silicon-bonded hydroxyl radicals in [b], in the presence of [c] a catalyst for the reaction of [a] with [b], and (2) cohydrolyzing the product from above with [d] a silane of the average formula

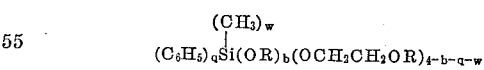

wherein R is as above defined, $q$ has an average value such that in the total of components [a]+[d] there is from 1 to 1.1 inclusive $C_6H_5$— radicals per silicon atom, $w$ has an average value such that in the total of [a]+[d] there is up to 0.1 inclusive $CH_3$— radicals per silicon atom and $b$ has an average value of up to $(4-q-w)$ inclusive, such that the sum total mol percent of silicon atoms of [a]+[d] above is from 90 to 25 mol percent inclusive, and of silicon atoms in [b] is from 10 to 75 mol percent inclusive.

The reaction (1) above can be carried out at any temperature including room temperature. However, it is advantageous to remove the by-product, alcohol as it is formed, and this is most easily done by heating and/or operating at reduced pressure. It is not necessary that the by-product alcohol be removed, however, so that with some of the more active catalysts the reaction proceeds spontaneously at room temperature. The reaction (1) is illustrated with a methoxy radical, as from [a], and a hydroxyl radical, as from [b], in the following schematic equation:

$$\equiv SiOCH_3 + \equiv SiOH \xrightarrow{cat.} \equiv SiOSi\equiv + CH_3OH$$

The net effects of reaction (1) is to replace the hydroxyl radicals of [b] with siloxy radicals containing one phenyl radical and two radicals selected from —OR and —OCH$_2$CH$_2$OR. Illustrating this with phenyltripropoxysilane, the reaction is as follows:

$$\equiv SiOH + \equiv C_6H_5Si(OC_3H_7)_3 \xrightarrow{cat.} \equiv SiO\overset{C_6H_5}{\underset{|}{Si}}(OC_3H_7)_2 + C_3H_7OH$$

Component [a] can be any compound or mixture of compounds defined above. Small amounts of $(C_6H_5)_2SiY_2$ and $C_6H_5(CH_3)SiY_2$, (Y is —OR or —OCH$_2$CH$_2$OR) can be present, but when it is desired that the completed composition contain $(C_6H_5)_2SiO$ and/or $C_6H_5(CH_3)SiO$ units, it is preferred that the above silanes be added with, or as component [d]. In compound [a] R can be methyl, ethyl, propyl, butyl, pentyl, or hexyl, both straight and branched chain. Thus, examples of —OR radicals includes —OCH$_3$, —OC$_3$H$_7$ and —OC$_6$H$_{13}$, and of —OCH$_2$CH$_2$OR radicals include —OCH$_2$CH$_2$OCH$_3$ and $$-OCH_2CH_2OC_4H_9$$

Examples of compounds that can be component [a] include $$C_6H_5Si(OCH_3)_3, \quad C_6H_5Si(OCH_2CH_2OCH_3)_3$$

$$C_6H_5Si(OC_3H_7)(OCH_2CH_2OC_4H_9)_2$$

$$C_6H_5Si(OCH_3)(OC_5H_{11})_2$$

$$C_6H_5Si(OCH_2CH_2OC_2H_5)(OCH_2CH_2OC_6H_{13})_2$$

and $C_6H_5Si(OCH_3)(OC_6H_{13})(OCH_2CH_2OC_4H_9)$. Preferred are the first two compounds illustrated.

As in the first method, components [a] and [d] can be conveniently combined as component [a], if desired. This alternate procedure is preferred when only $C_6H_5SiY_3$ is employed (Y is as earlier defined), but can be employed for any combination of components [a] and [d], if desired.

As in the first method above, a solvent is generally employed, its nature and value being the same as listed earlier. The preferred solvents are water-immiscible hydrocarbons, especially toluene, heptane and cyclohexane.

Hydroxylated polysiloxane [b] can contain only dimethylsiloxane units, or it can contain up to 10 mol percent of phenylmethylsiloxane units, and/or up to 10 mol percent of monomethylsiloxane units. When essentially none of the latter optional siloxane units are present, polysiloxane [b] is essentially hydroxyl-endblocked. When monomethylsiloxane units are present in polysiloxane [b], some silicon-bonded hydroxyl radicals are present on non-terminal silicon atoms.

The reaction between [a] and [b] is promoted by a catalyst for reaction (1). One operative class of catalysts is organic amines. Primary, secondary, and tertiary amines can be used as catalysts in this invention. It is preferred that these amines have a dissociation constant of at least $10^{-10}$. Examples of operative amines include the following: brucine, sec-butylamine, cocaine, diethylbenzylamine, diethylamine, diisoamylamine, diisobutylamine, dimethylamine, dimethylaminomethylphenol,
dimethylbenzylamine,
dipropylamine,
ethylamine,
ethylenediamine,
hydrazine,
isoamylamine,
isobutylamine,
isopropylamine,
menthanediamine,
methylamine,
methyldiethylamine,
t-octylamine,
t-nonylamine,
piperidine,
n-propylamine,
t-octadecylamine,
quinine,
tetramethylenediamine,
triethylamine,
triisobutylamine,
trimethylamine,
trimethylenediamine,
tripropylamine,
L-arginine,
L-lysine,
acontine,
benzylamine,
cinchonidine,
codeine,
coniine,
emetine,
o-methoxybenzylamine,
m-methoxybenzylamine,
p-methoxybenzylamine,
N,N-methoxybenzylamine,
o-methylbenzylamine,
m-methylbenzylamine,
p-methylbenzylamine,
N,N-methylbenzylamine,
morphine,
nicotine,
novocain base,
epsilonphenylamylamine,
delta-phenylbutylamine,
beta-phenylethylamine,
beta-phenylethylmethylamine,
gamma-phenylpropylamine,
N,N-isopropylbenzylamine,
physostigimine,
piperazine,
quinidine,
solamine,
sparteine,
tetramethylquanine,
thebaine,
t-butyl-2,4-dinitrophenylamine,
t-butyl-2-hydroxy-5-nitrobenzylamine,
t-butyl-4-isonitrosoamylamine,
t-octylamylamine,
t-octyl-2-(beta-butoxyethoxy)-ethylamine,
2,4,6-tris(dimethylamino)phenol,
aniline,
phenylhydrazine,
pyridine,
quinoline,
p-bromophenylhydrazine,
n-nitro-o-toluidine,
beta-ethoxyethylamine,
tetrahydrofurfurylamine,
m-aminoacetophenone,
iminodiacetonitrile,
putrescine,
spermin,
gamma-N,N-dimethylaminopropylpentamethyldisloxane,
p-toluidine
and veratrine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, alpha,beta-dimethylacrolein and amylamine, butyraldehyde and butylamine, acrolein and allylamine and formaldehyde and heptylamine.

Another class of catalysts for the reaction is the carboxylic acid salts of metals higher than hydrogen in the electromotive force series of metals. Specific examples of the metals that can be used are lead, tin, nickel, cobalt, iron, cadmium, chromium, zinc, manganese, aluminum, magnesium, barium, strontium, calcium, cesium, rubidium, potassium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate, potassium acetate, chromium octoate; salts of polycarboxylic acids such as dibutyl tin adipate and lead sebacate; and salts of hydroxy carboxylic acids such as dibutyl tin dilactate.

Another class of catalysts is the organic titanium compounds. These are titanium esters in which there are TiOC linkages, being derived either from an alcohol or a carboxylic acid. If derived solely from a carboxylic acid the titanate falls into the class of catalysts described above. If derived in part or entirely from an alcohol or alcohols, the titanate is of the formula $Ti(OP)_4$, wherein P is the residue of an alcohol molecule. The derived titanate can be from a combination of a carboxylic acid and alcohol.

Specific examples of organo titanium compounds which are operative herein include tetraethyl titanate, tetraisopropyl titanate, tetra-n-butyl titanate, tetra-2-ethylhexyl titanate, tetraphenyltitanate, tetraoctadecyl titanate, tetra-12-octadecenyl titanate, triethanolamine titanate, $$[(HOC_3H_6)_2N(CH_2)_3O]_2Ti[OCH(CH_3)_2]_2$$

$$[(CH_3CH_2)_2N(CH_2)_2O]_4Ti$$

$$[(C_6H_{13})_2N(CH_2)_6O]_2Ti[OCH_2CH(CH_3)_2]_2$$

$$[C_4H_9NH(CH_2)_4O]_4Ti$$

$$(HOCH_2CH_2NHCH_2O)_4Ti$$

tetrakistriethanolamine titanate-N-stearate, ethylene glycol titanate, $$Ti[OCH_2CH(CH_2CH_3)CH(OH)CH_2CH_2CH_3]_4$$

tetra(methylcellosolve) titanate, bis(acetylacetonyl)diisopropyl titanate,

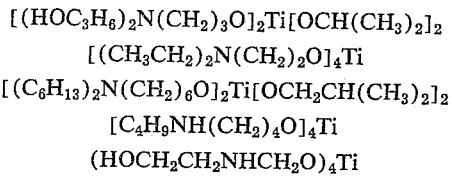

$$[HOOCCH(CH_3)O]_4Ti$$

$$[HOOC(CH_2)_4O]_2Ti(OH)_2$$

$$(CH_3COOCH_2O)_4Ti$$

$$(CH_3OOCCH_2O)_4Ti$$

and diisopropyldiacetoxy titanate.

In addition, solvent-soluble partial hydrolyzates of any of the above titanates can be employed and, in addition, part or all of the organoxy radicals can be replaced by $Z_3SiO-$ radicals wherein Z is a monovalent organic radical.

Preferred catalysts are the simpler organic amines such as n-hexylamine, dipropylamine, diethylamine and t-butylamine, as these function quite well and are easily removed from the product. Also quite desirable are the water-soluble metal carboxylates such as acetates and propionates, particularly potassium acetate. However, any of the above catalysts and modifications thereof, either alone or in combination with one another, can be employed if desired.

The quantity of catalyst to be used is not critical. As little as 0.01 percent by weight will function, although preferably, due to favorable reaction rate attained thereby, from 0.1 percent by weight and upward is used. While there is no critical upper limit to the amount that can be used, it is at once obvious that, since 0.1 percent by weight is sufficient, to use significantly more is wasteful and, especially if it is to be later removed, adds to the time and expense of the preparation procedure.

Cohydrolysis step (2) proceeds on contact with water. The usual procedure is to add the reaction mixture from (1) to water, although in this particular method the reverse reaction can easily well be employed. There should be enough water to allow complete hydrolysis of the reaction product from (1) and [d], and preferably there is an excess over this amount.

A small amount of a mineral acid can be present in the hydrolysis water, if desired. The acid often serves to hasten the hydrolysis reaction.

Component [d] of this process can be $C_6H_5SiY_3$ or a mixture of $C_6H_5SiY_3$ and $(C_6H_5)_2SiY_2$ and/or $C_6H_5(CH_3)SiY_2$, wherein Y is as earlier defined, there being no more than 10 mol percent of the two diorganosilanes present, based on the total components [a] and [d]. Part of component [d] may be, and normally is, already present as unused component [a] from reaction (1). As already stated, all of component [d] can be already present, if desired, although it is preferred, but not necessary, when the diorganosilanes above are to be employed in more than about two mol percent, that at least these be added as components [d] after the reaction (1).

Cohydrolysis step (2) produces the composition of this invention. If a solvent that is immiscible with water has been used, the composition is in solution and can be recovered by evaporation of the solvent. If a water-miscible solvent or no solvent has been employed, the product precipitates from the water. Either method of recovering the composition is satisfactory.

The composition of this invention can also be prepared by the cohydrolysis of a mixture of [A] a polysiloxane containing an average of at least two silicon-bonded hydrolyzable groups per molecule and having the average structure $$[(CH_3)_2SiO]_x[(CH_3)(C_6H_5)SiO]_y[(CH_3)SiO_{1.5}]_z$$

wherein the sum of $x+y+z$ has an average value of from 6 to 50 and y and z are already defined with [B] a hydrolyzable monophenylsilane or a mixture of a hydrolyzable monophenylsilane, phenylmethylsilane and/or diphenylsilane employing amounts of each component to give a composition of the defined invention. The above defined polysiloxanes containing hydrolyzable groups are equivalent to the earlier defined hydroxylated polysiloxanes (1)[b], except that they have hydrolyzable groups in place of the hydroxyl groups in (1)[b].

The hydrolyzable groups on both the siloxane and phenylsilanes can be any hydrolyzable group normally found in organosilicon compounds such as halogen atoms such as chlorine, bromine and iodine; hydrocarbonoxy groups such as methoxy, ethoxy, allyloxy, phenoxy, $$OCH_2CH_2OCH_3$$

$$OCH_2CH_2OCH_2CH_2OCH_3$$

$OCH_2CH_2OC_2H_5$ and beta-chloroethoxy; acyloxy groups such as acetoxy, formoxy, and propionoxy; and oxime groups such as dimethylketoxime and ethylmethylketoxime. Specific examples of the phenylsilanes used in this method are phenyltrimethoxysilane, phenyltriacetoxysilane, phenyl-$Si[O=NC(CH_3)_2]_3$, phenyltriphenoxysilane, phenylmethyldimethoxysilane and diphenyldibromosilane.

The cohydrolysis is carried out by adding the above defined mixture to water. As in the previous procedure, it is necessary to have sufficient water present to hydrolyze all the silicon-bonded halogen atoms. Preferably, an excess over this amount of water is supplied, and most preferably a sufficient excess is made available that there is not more than 10 percent by weight of hydrogen halide per weight of water remaining after complete hydrolysis.

As in the previous methods, a solvent can be employed, if desired. The same solvents as before stated are useable in this method.

The foregoing methods of preparing the organosilicon block copolymers of this invention are limited to diorganopolysiloxane blocks containing an average of 50 or less silicon atoms per molecule. Preparing block copolymers of this invention utilizing diorganopolysiloxane blocks having an average of from 6 to 100 silicon atoms per molecule is accomplished by the following method.

The polymer blocks of the average structure

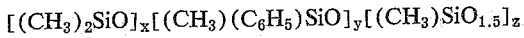

wherein the sum of $x+y+z$ has an average value from 6 to 100 inclusive, $y$ and $z$ each have a value of up to 10 percent of the sum of $x+y+z$, and there is at least two radicals, either hydroxyl or chlorine, per molecule are mixed with solvent, usually about one-half of the total amount of solvent used. The solvent can be any solvent previously used in the other methods of this invention, preferably toluene. The mixture of diorganopolysiloxane and solvent is mixed with enough water to give a final concentration of hydrogen halide from 5 to 15 weight percent based on the weight of the water. The hydrogen halide is usually formed during the hydrolysis step but if alkoxysilanes or siloxanes are used in place of the halosilanes normally employed, the hydrogen halide can be added to the mixture. Other hydrolysis catalyst besides the hydrogen halide can also be employed such hydrolysis catalysts are acetic acid, toluene sulfonic acid and hexafluoropropane sulfonic acid. Any catalyst used should be a catalyst which does not cause siloxane bond rearrangement. The diorganopolysiloxane, solvent and water are agitated to form a dispersion consisting of an organic phase and an aqueous phase. A mixture of solvent about one-half the total amount used, and

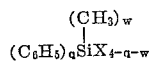

wherein $q$ has an average value of from 1 to 1.1 inclusive, X is a halogen, and $w$ has an average value up to 0.1 inclusive, is added to the above dispersion and stirred at least until the hydrolysis is completed. Alkoxysilanes and siloxanes as defined above are also operative, but an additional amount of condensation catalyst is required when these silanes and siloxanes are used. After the hydrolysis is complete the aqueous phase is separated and discarded. The residual hydrogen halide and water can be removed by azeotropic distillation from the organic phase, the product phase. After the removal of the residual acid and water the product can be heat bodied or bodied with a condensation catalyst such as zinc octoate. The solvent can be removed, if desired, by vacuum stripping, by spray drying, or by using a drum drier. The above method is usually carried out at 30 to 50 percent solids concentration. Any of the starting reactants as described in this invention can be used in the above method to prepare the compositions of this invention. The amounts of each ingredient used in this method have already been defined.

The compositions of this invention are solids at room temperature (e.g. 15–30° C.) having melting points substantially above room temperature. The compositions are soluble in ordinary hydrocarbon and halogenated solvents. The compositions can also be pulverized to a free-flowing powder. The compositions are cured by heating to infusible insoluble resins. Generally, heating above 150° C. is necessary to effect a good cure in a reasonable time, but some cure occurs at lower temperatures even in a short time. The rate of cure can be accelerated employing any of the known methods of curing organosilicon resins, although the more vigorous curing agents and/or catalysts should be avoided since these may modify the integrity of the essentially dimethylpolysiloxane block, which action may destroy the essential block structure of the resin. An especially useful class of catalysts for curing the instant composition to a resin are the organic amines, particularly the tertiary amines (e.g. tributylamine). Organosiloxane-soluble metal carboxylates, such as iron octoate and cobalt naphthenate are also quite satisfactory. These catalyze the intercondensation of the residual silicon-bonded hydroxyl radicals of the composition of this invention to produce the superior resin described earlier.

Additional materials can also be mixed with the composition of this invention, if desired. Preferably, these are heat-stable materials, and include organic materials such as phthalocyanins; metal oxides such as antimony oxide, titania, alumina, ferric oxide or zirconia, siliceous materials such as amorphous or crystalline forms of silica, such as glass fibers or frits such as diatomaceous earth, fume silica, crushed quartz, silica xerogels or sand; silicates such as aluminum silicate, magnesium silicate, zirconium silicate, magnesium aluminum silicate and calcium aluminum silicate; carbonaceous fillers such as graphite and carbon black; powdered metals such as aluminum, iron, copper and zinc; and asbestos or mica.

Further, other additives, such as oxidation inhibitors, coloring agents and other additives normally employed in organosilicon resins can also be present.

The organosilicon resins made from the composition of this invention have unusually good mechanical shock resistance, thermal shock resistance and retention of strength at elevated temperatures. In addition, they have an extremely low percentage of volatile fragments. The resins are useful in coating, encapsulating, laminating and molding applications wherein an organosilicon resin is required having the above stated desirable properties.

The organosilicon resins of this invention can be used in combination with other resins to obtain certain advantages such as lower cost resins, thermal shock resistant resins, harder resins, mechanical shock resistant resins and more solvent resistant resins. The resins of this invention can be combined with other conventional silicone resins, such as those prepared by hydrolyzing an organosilane or a mixture of organosilanes, to adjust the melting point to some desired range, to adjust the degree of hardness, to produce increased solvent resistances and to improve the handling properties. The amount of conventional silicone resins used is generally less than 75 weight percent of the total amount of resin and preferably less than 50 weight percent. Conventional fillers, pigments and colorants can also be added to the resin mixtures. Curing catalysts which are used to cure the resins of this invention can be used to cure the mixture of conventional silicone resin and the resin of this invention. The mixture of conventional silicone resin with the block copolymers of this invention are particularly useful for thermal shock resistant coatings such as thermal shock resistant coatings for resistors. Small amounts, no more than 25 weight percent based on the total resin weight of conventional organic resins and copolymers of silicone-organic resins can also be added to the resins of this invention and to the mixture of conventional silicone resins and the resin of this invention. An example of conventional organic resins are epoxy resins and diallylphthalate prepolymer resins.

Conventional silicone-organic copolymer resins can be added to the resin of this invention, such resins are silicone-alkyd resins, silicone-polyester resins and silicon-phenolic resins. The conventional organic resins and silicone-organic resins are available commercially. Other additives normally used with resins can also be added, such as fillers, curing catalyst and colorants.

Resistors can be coated by any conventional method, such as fluid bed coating process, immersion of a heated resistor into the powder coating formulation, applied from solution or molded on the resistor.

Molding compounds can be prepared from the resins of this invention. The molding compounds can be composed of the resin of this invention or other conventional resins can be added in amounts no more than 75 weight percent based on the total resin weight to the resin of this invention to give desirable products. An example of a preferred molding resin formulation is a resin composed of 40 to 60 weight percent based on the total weight of resin of a resin of this invention, and 40 to 60 weight percent of a conventional silicone resin which is composed of monophenylsiloxane units, diphenylsiloxane units, monomethylsiloxane units and dimethylsiloxane units such that the $C_6H_5$:Si ratio is from 0.5:1 to 0.8:1, the $CH_3$:Si ratio is from 0.4:1 to 0.6:1 and the $(C_6H_5+CH_3)$:Si ratio is from 1:1 to 1.4:1. The fillers and catalyst can be any of those conventionally used in the art.

The molding compounds can be prepared by any conventional method such as mixing the components together to obtain a homogeneous product.

The following examples are illustrative only and should not be construed as limiting the invention which is properly delineated in the appended claims.

Example 1

A solution of 528 g. (2.50 mols) of phenyltrichlorosilane and 24 g. of pyridine in 760 g. of toluene was placed in a reactor equipped with a mechanical stirrer. There was then slowly added, with vigorous stirring 185 g. (2.5 mols of dimethylsiloxane units) of hydroxyl endblocked essentially dimethylpolysiloxane having an average silicon-per-molecule content of 33, and containing 0.076 mol of hydroxyl radicals. Addition time was 30 minutes. Stirring was continued an additional 15 minutes after complete addition of the polysiloxane. This mixture was then added, slowly with good stirring, to 3156 g. of water. During the addition the reaction temperature rose from room temperature to 75° C. maximum. Total addition time was 15 minutes, after which the mixture was stirred an additional 15 minutes. The product, in the toluene, was washed free of residual chlorides. After the water had been removed, the solution was refluxed gently for 30 minutes in the presence of about 0.5 g. of potassium phenoxide to body the product. A portion of this solution was filmed out on a glass slide and the toluene allowed to evaporate. The film was cured at 150° C. in an oven to form a clear hard coating.

Example 2

A solution of 56 g. (0.75 mol of Si) of a hydroxyl endblocked essentially dimethylpolysiloxane having an average silicon atom per molecule content of 15 in 56 g. of toluene was added slowly over a period of 30 minutes to a rapidly stirred solution of 158 g. (0.75 mol) of phenyltrichlorosilane and 11.7 g. of pyridine in 228 g. of toluene. The mixture was stirred an additional 15 minutes after complete addition.

The above mixture was then added to 464 g. of water over a period of 15 minutes with rapid stirring. The temperature rose to a maximum of 75° C. during this time. Stirring was continued an additional 15 minutes after complete addition. The product in toluene was washed free of acids and water soluble materials and dried. It was then refluxed gently in the presence of 0.15 g. of toluene sulfonic acid to body the resin slightly. A thin, hard, tough, clear film formed on a glass slide when a portion of the solution was placed thereon and cured thereto by heating in an oven at 150° C. for a few minutes.

A portion of the solution was placed in a small dish and the toluene completely removed at 110° C. The weighed dry sample was heated 24 hours at 250° C., and the weight loss found to be 0.96 percent.

Example 3

In this example the procedure for preparing the composition was the same as in the two preceding examples. There was used 266 g. (3.6 mols of Si) of a hydroxylendblocked essentially dimethylpolysiloxane having an average degree of polymerization of 21, 508 g. (2.4 mols) of phenyltrichlorosilane, 52 g. of pyridine, 864 g. of toluene and 3,487 g. of water. After the washing step following hydrolysis, the toluene solution was diluted with 180 g. butanol, to give a solution 36.1 percent in siloxane. This siloxane made a clear, hard, flexible, tough plastic when the solvent was removed and the solid heated with 0.5 percent by weight tributylamine.

Example 4

92 g. (1.25 mols of siloxane) of a hydroxyl endblocked essentially dimethylpolysiloxane having an average degree of polymerization of 21 was added slowly over a period of about 30 minutes to a rapidly stirred solution of 790 g. (3.75 mols) of phenyltrichlorosilane and 13 g. of pyridine in 862 g. of toluene. Stirring was then continued an additional 15 minutes.

The product above was added to 3,690 g. of water over a period of 15 minutes, and stirring continued an additional 15 minutes. The toluene solution of the finished composition was washed free of chlorides and dried.

When the solvent was removed by vacuum stripping, there was obtained a solid that could be powdered and used in coating powder-type operations.

Example 5

A solution of 381 g. (1.80 mols) of phenyltrichlorosilane, 38 g. (0.20 mols) of phenylmethyldichlorosilane and 20 g. of pyridine in 360 g. of toluene was added rapidly to a solution of 222 g. of the hydroxyl endblocked essentially dimethylpolysiloxane of Example 1 in 360 g. of toluene, with rapid stirring. The stirring was continued for 30 minutes after the above addition. The above product was then added rapidly to 1908 g. of water, the said addition requiring less than three minutes. The mixture was heated to 60° C. with stirring for 30 minutes, after which it was cooled and the toluene layer was freed of chlorides by washing with water. Following drying of the toluene solution, enough toluene was volatilized to leave a solution 50 percent in siloxanes.

This product made a tough, strong, flexible film when cast as in Example 1.

Equivalent results are obtained when the phenylmethyldichlorosilane above is replaced by an equimolar amount of diphenyldichlorsilane.

Example 6

148 g. (2.0 mols of siloxane) of a hydroxylated copolymer containing 98 mol percent of dimethylsiloxane units and 2 mol percent of monomethylsiloxane units, having an average of 12 siloxane units per molecule, were added to a solution of 423 g. (2.0 mols) of phenyltrichlorosilane and 51.5 g. of pyridine in 609 g. of toluene. Addition time was 14 minutes, and rapid stirring was employed throughout. This mixture was then added to a solution of 120 g. of isopropanol in 2847 g. of water. Addition time was four minutes, with rapid stirring throughout. The toluene solution was then washed free of chlorides and isopropanol, and dried. Toluene was removed by volatilization to concentrate the siloxanes to 65 percent by weight in toluene. This solution was employed to impregnate glass cloth in the preparation of glass cloth laminates. The toughness, flexibility and thermal shock resistance of the resulting resin contribute to the superior performance of such a laminate.

Example 7

A solution of 103.5 g. (1.4 mols of silicon atoms) of a fluid essentially of the average formula

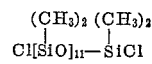

and 444 g. (2.1 mols) of phenyltrichlorosilane in 550 g. of toluene was added over a time of five minutes to a rapidly stirred mixture of 126 g. of isopropanol and 3088 g. of water. The toluene layer was washed free of chlorides, dried and concentrated to 65 percent by weight of siloxanes. The solid siloxanes were then recovered in a drum drier in a form suitable for molding operations. A disk molded from this product displayed excellent mechanical shock resistance in that it bounced without either chipping or cracking when forcefully hurled to a concrete floor. The best prior art resin made into a disk shatters when so abused.

*Example 8*

When any of the following hydroxylated polysiloxanes are substituted for the hydroxyl endblocked essentially dimethylpolysiloxane of Example 1, good products result.

(a) 577.5 g. (7.5 mols) of a hydroxyl endblocked essentially dimethylpolysiloxane having an average of 6 silicon atoms per molecule.

(b) 20.7 g. (0.28 mol) of a hydroxylated polysiloxane containing 88 mol percent of dimethylsiloxane units, 10 mol percent of monomethylsiloxane units and 2 mol percent of phenylmethylsiloxane units, having an average of 50 silocon atoms per molecule.

(c) 121.6 g. (1.50 mols) of a hydroxyl endblocked essentially diorganosiloxane containing 90 mol percent of dimethylsiloxane units and 10 mol percent of phenylmethylsiloxane units, having an average of 20 silicon atoms per molecule.

*Example 9*

A mixture of 712 g. (3.6 mols) of phenyltrimethoxysilane, 88 g. (1.2 mols of Si) of a hydroxyl endblocked essentially dimethylpolysiloxane having an average of 33 siloxane units per molecule and 0.8 g. of potassium acetate were heated in a reactor to 100° C. with stirring. A 500 ml. portion of toluene was then added and heating and stirring continued. The mixture was refluxed at 131° C. for one hour, and cooled to 80° C., at which time 107 g. of water containing a trace of HCl were added rapidly. The mixture was reheated to reflux and methanol removed over a period of 2½ hours. The product was cooled, filtered, the water removed, and then the solvent volatilized off. A slightly tacky white solid was obtained.

When this solid was mixed with one percent by weight of n-hexylamine and molded at a temperature above its melting point, a tough, hard, flexible resin resulted. When ferric octoate is used in place of n-hexylamine, an equally fine resin results.

*Example 10*

In this example, 384 g. (1.94 mols) of phenyltrimethoxysilane, 16 g. (0.216 mol of Si) of the polydimethylsiloxane of the preceding example, 2 g. of n-hexylamine and 200 g. of toluene were mixed and heated to reflux for one hour at 129° C. Then the product was stripped to a boiling point of 135° C., which removed the by-produced methanol and part of the toluene. The product was cooled to room temperature and 57.5 g. of water slightly acid with $H_2SO_4$ was added rapidly. Methanol was stripped off to a pot temperature of 90° C. Following removal of water and filtration, the product was stripped of remaining solvent at high vacuum. A hard solid was obtained which cured on heating to a unitary hard slightly flexible tough resin.

*Example 11*

When any of the following silanes are substituted in the amount shown for the phenyltrimethoxysilane of Example 9 good products are obtained.

(a) 363 g. (1.1 mols) of $C_6H_5Si(OCH_2CH_2OCH_3)_3$ and 32.8 g. (0.1 mol) of $(C_6H_5)_2Si(OC_4H_9)_2$.

(b) 388.8 g. (1.62 mol) of $C_6H_5Si(OC_2H_5)_3$ and 73.8 g. (0.18 mol) of $C_6H_5(CH_3)Si(OCH_2CH_2OC_6H_{13})_2$.

(c) 113.2 g. (0.38 mol) of
$C_6H_5Si(OC_3H_7)_2(OCH_2CH_2OCH_3)$ 3.22 g. (0.01 mol) of $C_6H_5(CH_3)Si(OC_6H_{13})_2$ and 3.42 g. (0.01 mol) of $(C_6H_5)_2Si(OC_4H_9)(OCH_2CH_2OC_4H_9)$.

*Example 12*

Equivalent results are obtained when any of the following catalysts are employed in place of the potassium acetate of Example 9: sec-butylamine, dimethylbenzylamine, piperidine, ethylenediamine, octadecylamine, cinchonidine, aluminum stearate, sodium laurate, iron naphthenate, dibutyltin dilaurate, tetraisopropyltitanate, tetra-12-octadecenyltitanate,

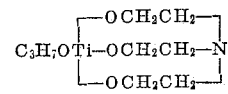

and $[(CH_3)_3SiO]_4Ti$.

*Example 13*

Equivalent results are obtained when the dimethylpolysiloxane of Example 9 is replaced by any of the polysiloxanes shown below.

(a) A hydroxylated polysiloxane having an average of six silicon atoms per molecule, containing 80 mol percent of dimethylsiloxane units, 10 mol percent of phenylmethylsiloxane units and 10 mol percent of monomethylsiloxane units.

(b) A hydroxylated polysiloxane having an average of 15 silicon atoms per molecule, containing 99 mol percent of dimethylsiloxane units and one mol percent of monomethylsiloxane units.

(c) A hydroxyl endblocked essentially diorganopolysiloxane having an average of 50 silicon atoms per molecule, containing 92.5 mol percent of dimethylsiloxane units and 7.5 mol percent of phenylmethylsiloxane units.

*Example 14*

A dispersion of 2,220 g. of hydroxyl endblocked essentially dimethylpolysiloxane having an average of 55 silicon atoms per molecule and 3,609 g. of toluene in 19,450 g. of water, was prepared by mixing the components and agitating. A solution was prepared by mixing 3,810 g. of phenyltrichlorosilane, 382 g. of phenylmethyldichlorosilane, and 3,609 g. of toluene. The solution was added from a separatory funnel to the dispersion of the dimethylsiloxane and toluene in water. The HCl produced by hydrolysis of the chlorosilanes resulted in a 10 percent by weight aqueous solution of HCl. The addition required 11 minutes during which time the temperature increased from room temperature to 60° C. The mixture was stirred for 30 minutes while maintaining the temperature at 60° C. The aqueous phase containing most of the HCl was separated from the product phase. The product phase was azeotroped to remove any residual HCl and water. The solvent was removed and a clear resin with a melting point of 82° C. was obtained.

*Example 15*

An organosilicon resin block copolymer was prepared by the procedure of Example 14. 222 g. of a hydroxyl endblocked essentially dimethylpolysiloxane containing an average of 78 silicon atoms per molecule was mixed with 360 g. of toluene and 360 g. of water to form a dispersion. To the dispersion was added a solution of 381 g. of phenyltrichlorosilane, 38 g. of phenylmethyldichlorosilane and 360 g. of toluene. The product layer was vacuum stripped producing a clear solid resin with a melting point of 88° C.

*Example 16*

To a dispersion of 93 g. of a hydroxyl-endblocked essentially dimethylpolysiloxane block having an average of 100 silicon atoms per molecule and 192 g. of toluene in 550 g. of water was added a solution of 238 g. of phenyltrichlorosilane, 24 g. of phenylmethyldichlorosilane and 192 g. of toluene. The procedure was that of Example 14.

The resin block copolymer was slightly hazy at 100 percent solids.

Example 17

Similar results are obtained when the following dimethylpolysiloxanes in amounts specified replace the dimethylpolysiloxane in Example 14.

(a) 3070 g. of a hydroxylated polysiloxane having an average of 57 silicon atoms per molecule and containing 90 mol percent dimethylsiloxane units and 5 mol percent phenylmethylsiloxane units and 5 mol percent monomethylsiloxane units.

(b) 2853 g. of a hydroxylated polysiloxane having an average of 75 silicon atoms per molecule and containing 95 mol percent of dimethylsiloxane units and 5 mol percent of phenylmethylsiloxane units.

(c) 2220 g. of a hydroxylated dimethylpolysiloxane having an average of 90 silicon atoms per molecule.

Example 18

A solution of 762 g. of phenyltrichlorosilane, 76 g. of phenylmethyldichlorosilane and 720 g. of toluene was added one-half at a time to a dispersion of 457 g. of chlorine-endblocked dimethylpolysiloxane having an average of 35 silicon atoms per molecule and 720 g. of toluene in 3800 g. of water. The temperature increased from room temperature to 53°–59° C. and the mixture was stirred for 30 minutes. The aqueous phase was separated from the product phase. The product phase was azeotroped to remove the residual hydrogen chloride and water. The solution was then heat bodied at 40 percent solids for 21 hours at 113° C. The solvent was removed by vacuum stripping to 150° C. The clear resin had a melting point of 116° C.

(a) A resistor coating was prepared by blending 75 parts by weight of the above block copolymer resin with 25 parts by weight of a commercially available phenylmethyl silicone resin having a $C_6H_5$:Si ratio of about 0.7:1 and a $CH_3$:Si ratio of about 0.6:1. The resin blend was filled with 100 parts by weight of a commercial silica. The composition was cured with 0.5 part by weight of cerium naphthanate. The formulation was compounded on a 100° C. two roll mill. The compounded formulation was powdered and applied to resistors by immersing the resistors, which have been heated to 225° C., in the powder and then cured for 12 hours at 250° C. The coated resistors withstood 10 cycles of thermal shocking at −70° C. to 150° C.

(b) Equivalent results were obtained when 50 parts of the above block copolymer resin and 50 parts of the commercially available phenylmethyl silicone resins were used. The other conditions were as described in (a) above.

(c) Equivalent results were obtained when 85 parts by weight of the above block copolymer resin was blended with 15 parts by weight of a commercially available epoxy resin. The other conditions were as described in (a) above. The resistors were coated by a fluid bed coating process. Besides excellent thermal shock resistance, good solvent resistance was also obtained.

Example 19

A resin prepared according to the procedure of Example 14 and being composed of 60 mol percent of dimethylsiloxane units forming blocks of essentially dimethylpolysiloxane having an average of 39 silicon atoms per molecule and blocks of monophenylsiloxane units, 36 mol percent, and phenylmethylsiloxane units, 4 mol percent, was formulated with commercially available pigments, fillers and catalyst in a conventional manner. A molding compound which had excellent thermal shock resistant properties and mechanical shock resistant properties was obtained.

Example 20

When the block copolymer resin of Example 19 was blended in equal proportions with a commercially available phenylmethylsilicone resin having a $C_6H_5$:Si ratio of about 0.7:1 and a $CH_3$:Si ratio of about 0.5 to 1 and blended with the commercially available pigments, fillers and catalyst, a molding compound was formulated which had excellent thermal shock resistant properties, −70° C. to 150° C.

That which is claimed is:

1. A block copolymer comprising
(A) polymer blocks of the average structure

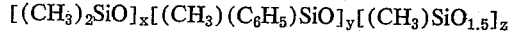

wherein the sum of $x+y+z$ has an average value of from 6 to 50 inclusive, and $y$ and $z$ each have a value of up to 10 percent of the sum of $x+y+z$, and
(B) polymer blocks of the average unit formula

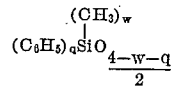

wherein $q$ has an average value of from 1 to 1.1 inclusive, and $w$ has an average value of up to 0.1 inclusive,
the siloxane units in (A) being from 10 to 75 mol percent and the siloxane units in (B) being from 25 to 90 mol percent of the total siloxane units in said block copolymer.

2. A block copolymer in accordance with claim 1 wherein $z$ is 0 and $y$ is 0.

3. A block copolymer comprising
(A) polymer blocks of the average structure

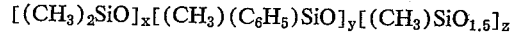

wherein the sum of $x+y+z$ has an average value of from 6 to 100 inclusive, and $y$ and $z$ each have a value of up to 10 percent of the sum of $x+y+z$, and
(B) polymer blocks of the average unit formula

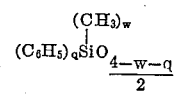

wherein $q$ has an average value of from 1 to 1.1 inclusive, and $w$ has an average value of up to 0.1 inclusive,
the siloxane units in (A) being from 10 to 75 mol percent and the siloxane units (B) being from 25 to 90 mol percent of the total siloxane units in said block copolymer, the minimum mol percent of siloxane units (B), when the sum of $x+y+z$ has an average value of from 50 to 100 being determined by the equation $$\frac{50M}{S}+0.1S=30$$

where M is the minimum mol percent of siloxane units (B) and S is the sum of $x+y+z$.

4. A block copolymer in accordance of claim 3 wherein the siloxane units in (A) are from 25 to 65 mol percent and the siloxane units in (B) are from 75 to 35 mol percent of the total siloxane units in said block copolymer.

5. A block copolymer in accordance of claim 3 wherein the siloxane units in (A) are from 40 to 65 mol percent and the siloxane units in (B) are from 60 to 35 mol percent of the total siloxane units in said block copolymer.

6. A molding compound comprising a resin mixture of at least 25 weight percent based on the total weight of the resin mixture of a block copolymer in accordance with claim 3 and no more than 75 weight percent based on the total weight of the resin mixture of a phenylmethylsilicone resin which is composed of monophenylsiloxane units, diphenylsiloxane units, monomethylsiloxane units and dimethylsiloxane units such that the $C_6H_5$:Si ratio is from 0.5:1 to 0.8:1, the $CH_3$:Si ratio is from 0.4:1 to 0.6:1 and the $(C_6H_5+CH_3)$:Si ratio is from 1:1 to 1.4:1, a filler and a curing catalyst.

7. A thermal shock resistant coating powder comprising
   (AA) a resin mixture of at least 25 weight percent of a block copolymer in accordance with claim 3 and no more than 75 weight percent of another silicon resin,
   (BB) a filler, and
   (CC) a curing catalyst.

8. A coated resistor comprising a resistor completely coated with a cured thermal shock resistant coating powder of claim 7.

9. A thermal shock resistant coating powder comprising a block copolymer in accordance with claim 3, a filler and a curing catalyst.

10. A coated resistor comprising a resistor completely coated with a cured thermal shock resistant coating powder of claim 9.

11. A block copolymer in accordance with claim 3 wherein $z$ is 0.

12. The composition according to claim 11 wherein $y$ has a value of up to 2 percent of the sum of $x+y+z$ and $z$ has an average value of up to 2 percent of the sum of $x+y+z$.

13. The composition according to claim 12 wherein $w$ has an average value of up to 0.05 inclusive.

14. A block copolymer comprising
   (A) from 40 to 65 mol percent of polymer blocks consisting essentially of dimethylsiloxane units, there being an average of from 6 to 100 of the said siloxane units per polymer block, and
   (B) from 60 to 35 mol percent of polymer blocks consisting essentially of units of the formula $$(C_6H_5)SiO_{1.5}$$

said mol percentages being based on the silicon atoms in the polymer blocks, the minimum mol percent of $(C_6H_5)SiO_{1.5}$, units, (B), when the siloxane units per polymer block has an average of from 50 to 100 units, being determined by the equation $$\frac{50M}{S}+0.1\,S=30$$

where M is the minimum mol percent of siloxane units, (B), and S is the average number of dimethylsiloxane units per block in (A).

15. A method comprising
   (I) reacting
      (a) $(C_6H_5)SiX_3$, wherein X is a halogen atom, with
      (b) a hydroxylated polysiloxane of the average structure $$[(CH_3)_2SiO]_x[(CH_3)(C_6H_5)SiO]_y[(CH_3)SiO_{1.5}]_z$$

wherein the sum of $x+y+z$ has an average value of from 6 to 50 inclusive, and $y$ and $z$ each have a value of up to 10 percent of the sum of $x+y+z$, there being an average of at least two silicon-bonded hydroxyl radicals per molecule of said polysiloxane,
   in amount such that there is at least one mol of (a) $(C_6H_5)SiX_3$ per mol of silicon-bonded hydroxyl radicals in (b) under conditions removing the by-produced hydrogen halide as formed, and
   (II) cohydrolyzing the product from above with
      (c) a halosilane of the average formula $$(C_6H_5)_qSiX_{4-w-q}^{(CH_3)_w}$$

wherein X is as above defined, $q$ has a value such that in the total of components (a)+(c) there is from 1 to 1.1 inclusive $C_6H_5-$ radicals per silicon atom and $w$ has a value such that in the total of (a)+(c) there is up to 0.1 inclusive $CH_3-$ radicals per silicon atom,
such that the sum total mol percent of silicon atoms in $(C_6H_5)SiX_3$ of (a) and $$(CH_3)_w(C_6H_5)_qSiX_{4-w-q}$$

of (c) comprises from 90 to 25 mol percent inclusive of the total silicon atoms in (a), (b) and (c), and the silicon atoms in (b) comprise from 10 to 75 mol percent inclusive of the total number of silicon atoms in (a), (b) and (c).

16. The method according to claim 15 wherein X is chlorine.

17. A method comprising
   (I) reacting
      (a) $(C_6H_5)SiX_3$ wherein X is a halogen atom, with
      (b) a polysiloxane essentially of the formula $$HO[\underset{(CH_3)_2}{Si}O]_xH$$

wherein $x$ has an average value of from 6 to 50 inclusive, in amount such that there is at least one mol of (a) $(C_6H_5)SiX_3$ per mole of silicon-bonded hydroxyl radicals in (b) under conditions removing the by-produced hydrogen halide as formed, and
   (II) cohydrolyzing the product from above with
      (c) a halosilane of the average formula $$(C_6H_5)_qSiX_{4-w-q}^{(CH_3)_w}$$

wherein X is as above defined, $q$ has a value such that in the total of components (a)+(c) there is from 1 to 1.1 inclusive $C_6H_5-$ radicals per silicon atom and $w$ has a value such that in the total of (a)+(c) there is up to 0.1 inclusive $CH_3-$ radicals per silicon atom,
such that the sum total mol percent of silicon atoms in $(C_6H_5)SiX_3$ of (a) and $(CH_3)_w(C_6H_5)_qSiX_{4-w-q}$ of (c) is from 90 to 25 mol percent inclusive, and of silicon atoms in (b) is from 10 to 75 mol percent inclusive.

18. The method according to claim 17 wherein X is chlorine.

19. A method comprising
   (1) reacting
      [a] $$C_6H_5Si(OCH_2CH_2OR)_{3-a}^{(OR)_a}$$

wherein each R is an alkyl radical of from 1 to 6 inclusive carbon atoms and $a$ is an integer from 0 to 3 inclusive with
      [b] a hydroxylated polysiloxane of the average structure $$[(CH_3)_2SiO]_x[(CH_3)(C_6H_5)SiO]_y[(CH_3)SiO_{1.5}]_z$$

wherein the sum of $x+y+z$ has an average value of from 6 to 50 inclusive, and $y$ and $z$ each have a value of up to 10 percent of the sum of $x+y+z$, there being an average of at least two silicon-bonded hydroxyl radicals per molecule of said polysiloxane, in amount such that there is at least one mole of [a]

$$C_6H_5Si(OCH_2CH_2OR)_{3-a}^{(OR)_a}$$

per mol of silicon-bonded hydroxyl radicals in [b], in the presence of
   [c] a catalyst for the reaction of [a] with [b],
   (2) cohydrolyzing the product from above with
      [d] a silane of the average formula $$(C_6H_5)_qSi(OR)_b(OCH_2CH_2OR)_{4-b-q-w}^{(CH_3)_w}$$

wherein R is as above defined, $q$ has an average value of such that in the total of components [a] and [d] there is from 1 to 1.1 inclusive $C_6H_5-$ radicals per silicon atom, $w$ has an average value such that in the total of [a]+[d] there is up to 0.1 inclusive $CH_3-$ radicals per silicon atoms and $b$ has an average value of up to $(4-q-w)$ inclusive, such that the sum total mol percent of silicon atoms of [a]+[d] above is from 90 to 25 mol percent inclusive, and of silicon atoms in [b] is from 10 to 75 mol percent inclusive.

20. The method of claim 19 wherein R is methyl and $a$ is 3.

21. The method of claim 20 wherein catalyst [c] is a metal carboxylate.

22. The method of claim 21 wherein catalyst [c] is an alkali acetate.

23. A method comprising
(1) reacting
[a] from 90 to 25 mol percent inclusive of $(C_6H_5)SiY_3$ wherein Y is a radical selected from the group consisting of $-OCH_3$ and $$-OCH_2CH_2OCH_3$$

radicals, with
[b] from 10 to 75 mol percent inclusive, based on the silicon atoms thereof, of a hydroxylated essentially dimethylpolysiloxane, there being an average of from 6 to 50 inclusive silicon atoms per polysiloxane molecule, there being in addition an average of at least two silicon-bonded hydroxyl radicals per molecule of said polysiloxane, in the presence of
[c] a catalyst selected from the group consisting of organic amines and metal carboxylates, and
(2) hydrolyzing the reaction product from above.

24. The method of claim 23 wherein Y is methoxy.

25. The method of claim 23 wherein [c] is an alkali acetate.

26. The method comprising cohydrolyzing a mixture of
[A] a polysiloxane containing on the average at least 2 silicon-bonded hydrolyzable groups per molecule and having the average structure $$[(CH_3)_2SiO]_x[(CH_3)(C_6H_5)SiO]_y[(CH_3)SiO_{1.5}]_z$$

wherein the sum of $x+y+z$ has an average value of from 6 to 50 inclusive, and $y$ and $z$ each have a value of up to 10 percent of the sum of $x+y+z$, with
[B] a silane of the average formula $$(C_6H_5)_qSiZ_{4-w-q}(CH_3)_w$$

wherein Z is a hydrolyzable substituent, $q$ has a value of from 1 to 1.1 inclusive, and $w$ has an average value of up to 0.1 inclusive, the silicon atoms in [A] being from 10 to 75 mol percent and the silicon atoms in [B] being from 25 to 90 mol percent of the total number of silicon atoms of [A]+[B], by adding said mixture to water.

27. The method of claim 26 wherein the hydrolyzable groups of [A] and the hydrolyzable substituents of [B] are halogen atoms.

28. A method comprising
(I) reacting
(a) from 90 to 25 mol percent of $(C_6H_5)SiX_3$, wherein X is a halogen atom, with
(b) from 10 to 75 mol percent inclusive, based on the silicon atoms thereof, of a hydroxylated essentially dimethylpolysiloxane, there being an average of from 6 to 50 inclusive silicon atoms per polysiloxane molecule, there being an average of at least two silicon-bonded hydroxyl radicals per molecule of said polysiloxane,
removing the by-produced halogen halide as formed, and
(II) hydrolyzing the reaction product from above.

References Cited
UNITED STATES PATENTS

| | | | |
|---|---|---|---|
| 2,637,719 | 5/1953 | Dereich | 260—46.5 |
| 2,890,188 | 6/1959 | Konkle et al. | 260—29.1 |
| 2,917,480 | 12/1959 | Bailey et al. | 260—825 |
| 3,127,363 | 3/1964 | Nitzsche et al. | 260—18 |
| 3,202,634 | 8/1965 | Merker | 260—46.5 |

FOREIGN PATENTS

| | | |
|---|---|---|
| 848,311 | 9/1960 | Great Britain. |
| 913,523 | 12/1962 | Great Britain. |

DONALD E. CZAJA, *Primary Examiner.*

LEON J. BERCOVITZ, *Examiner.*

F. McKELVEY, *Assistant Examiner.*